United States Patent

Osenbaugh et al.

Patent Number: 5,538,273
Date of Patent: Jul. 23, 1996

[54] CASER ADJUSTMENT APPARATUS

[75] Inventors: Carl D. Osenbaugh, Ypsilanti, Mich.; Kerry R. Shannon, Holland, Ohio

[73] Assignee: Dana Corporation, Toledo, Ohio

[21] Appl. No.: 385,329

[22] Filed: Feb. 8, 1995

[51] Int. Cl.⁶ .................................. B62D 17/00
[52] U.S. Cl. .................................. 280/661
[58] Field of Search .................................. 280/661

[56] References Cited

U.S. PATENT DOCUMENTS

| | | | |
|---|---|---|---|
| 2,405,458 | 8/1946 | Slack et al. | 280/661 |
| 2,923,555 | 2/1960 | Kost et al. | 280/96.1 |
| 3,342,507 | 9/1967 | Koch et al. | 280/96.1 |
| 4,243,339 | 1/1981 | Dickerson | 403/4 |
| 4,252,338 | 2/1981 | Ingalls et al. | 280/661 |
| 4,650,208 | 3/1987 | Mason | 280/661 |
| 4,754,991 | 7/1988 | Jordan | 280/661 |
| 4,831,744 | 5/1989 | Specktor et al. | 33/600 |
| 4,867,473 | 9/1989 | Jordan | 280/661 |
| 4,953,889 | 9/1990 | Reilly | 280/661 |
| 5,316,332 | 5/1994 | Ingalls | 280/661 |

*Primary Examiner*—Kenneth R. Rice
*Attorney, Agent, or Firm*—Oldham & Oldham Co.

[57] ABSTRACT

A steerable axle assembly for use in a motor vehicle. The assembly includes a tube yoke attached to an axle tube, with the yoke having vertically spaced arms. The assembly further includes a steering knuckle having a pair of vertically spaced flanges. At least one of the steering knuckle flanges is rotatably attached to a mating tube yoke arm, via a bearing cap. The other steering knuckle flange is rotatably attached to the mating tube yoke arm via a second bearing cap or a ball joint. Each bearing cap includes a mounting flange releasably attached to one of the tube yoke arms or steering knuckle flanges, a first generally cylindrical portion attached to the mounting flange and disposed in a bore formed in the tube yoke arm, or steering knuckle flange to which the mounted flange is attached, and a second generally cylindrical portion attached to the first generally cylindrical portion and disposed in a stepped bore formed in the mating tube yoke arm or steering knuckle flange so as to pilot a bearing assembly contained therein. The longitudinal centerline axes of the first and second generally cylindrical portions are offset relative to one another and the mounting flange of the bearing cap may be indexed relative to the tube yoke arm or steering knuckle flange to which it is releasably attached, so as to effect a change in position of the steering knuckle relative to the tube yoke, and accordingly, to effect a caster adjustment.

11 Claims, 2 Drawing Sheets

CASER ADJUSTMENT APPARATUS

BACKGROUND OF THE INVENTION

1. Field of the Invention

The invention relates generally to a caster adjustment apparatus and, more particularly, to a caster adjustment apparatus for use in a steerable axle assembly, of either the driven or non-driven type, of a motor vehicle.

2. Related Art

Motor vehicles may employ a solid, steerable front axle arrangement in which a yoke is fixedly attached to the solid axle and a steering knuckle is pivotally attached to the yoke via a single shaft, or kingpin, or alternatively by spaced apart ball joints. Alternatively, in the case of a driven, steerable front axle arrangement, the yoke may be fixedly attached to an axle housing surrounding the driving axle shaft. In either case, the steering knuckle is coupled with the spindle upon which the vehicle wheel is mounted for rotation. In response to control forces, the steering knuckle pivots relative to the yoke and axle to provide steering at the wheels. Caster and camber adjustments are critical to proper road handling and tire wear. Caster is the angle, in a side elevational view of the vehicle, between the steering, or kingpin axis and the vertical. Caster angle is important in vehicle suspensions because it is the caster adjustment which provides part of the tendency of the vehicles' wheels to return to a straight ahead position following negotiation of a curve. Limited means have been available previously to adjust caster. Limited caster correction can be achieved by placing shims between the axle and leaf springs. While such an approach may be effective if both wheels require equal correction for caster, the shimming approach has been shown to be ineffective and undesirable due to the need of twisting the relatively stiff axle. Additionally, while ball joints permit an initial setting of caster, they are difficult to disassemble and are typically not reusable. Accordingly, ball joints do not provide a viable option for subsequent caster adjustment after initial assembly. Subsequent devices, comprising kingpins in conjunction with one or more eccentric bushings, have been used in an attempt to overcome the limitations of prior devices.

Automotive design engineers continue to search for a simple, cost-effective, and reusable means for providing caster adjustment in steerable axle assemblies.

SUMMARY OF THE INVENTION

Accordingly, the present invention is directed to a steerable axle assembly for use in a motor vehicle, wherein the assembly may be used to adjust caster. According to a preferred embodiment, the assembly comprises a tube yoke attached to an axle tube of the vehicle, with the tube yoke having vertically spaced upper and lower arms each having a bore formed therethrough. The assembly further comprises a steering knuckle coupled to a wheel spindle of the vehicle, with the steering knuckle having an upper flange disposed adjacent the upper arm of the tube yoke, and a lower flange disposed adjacent a lower arm of the tube yoke. Each of the steering knuckle flanges includes a bore formed therein. The bore formed in a first one of the tube yoke arms and steering knuckle flanges comprises a stepped bore and the assembly further includes a bearing assembly disposed in a first portion of the stepped bore. The assembly further comprises a bearing cap having a mounting flange releasably attached to a second one of the tube yoke arms and steering knuckle flanges, a first generally cylindrical portion attached to the mounting flange and disposed within the bore of the second one of the tube yoke arms and steering knuckle flanges, and a second generally cylindrical portion attached to the first generally cylindrical portion and disposed in the stepped bore so as to pilot the bearing assembly. The first and second generally cylindrical portions each have a longitudinal centerline axis, with the two axes being offset from one another. Rotation of the bearing cap relative to the second one of the tube yoke arms and steering knuckle flanges, from a first releasably attached position to a second releasably attached position, causes the steering knuckle to move relative to the tube yoke, thereby resulting in an adjustment of caster.

A main advantage of the present invention is to provide a simple, cost-effective, and reusable means for adjusting caster in steerable axle assemblies.

BRIEF DESCRIPTION OF THE DRAWINGS

The structural features and functions of the present invention, as well as the aforementioned and other advantages derived therefrom, will become more apparent from the subsequent detailed description of the preferred embodiments when taken in conjunction with the accompanying drawings, wherein.

DETAILED DESCRIPTION OF THE DRAWINGS

Figure 1:
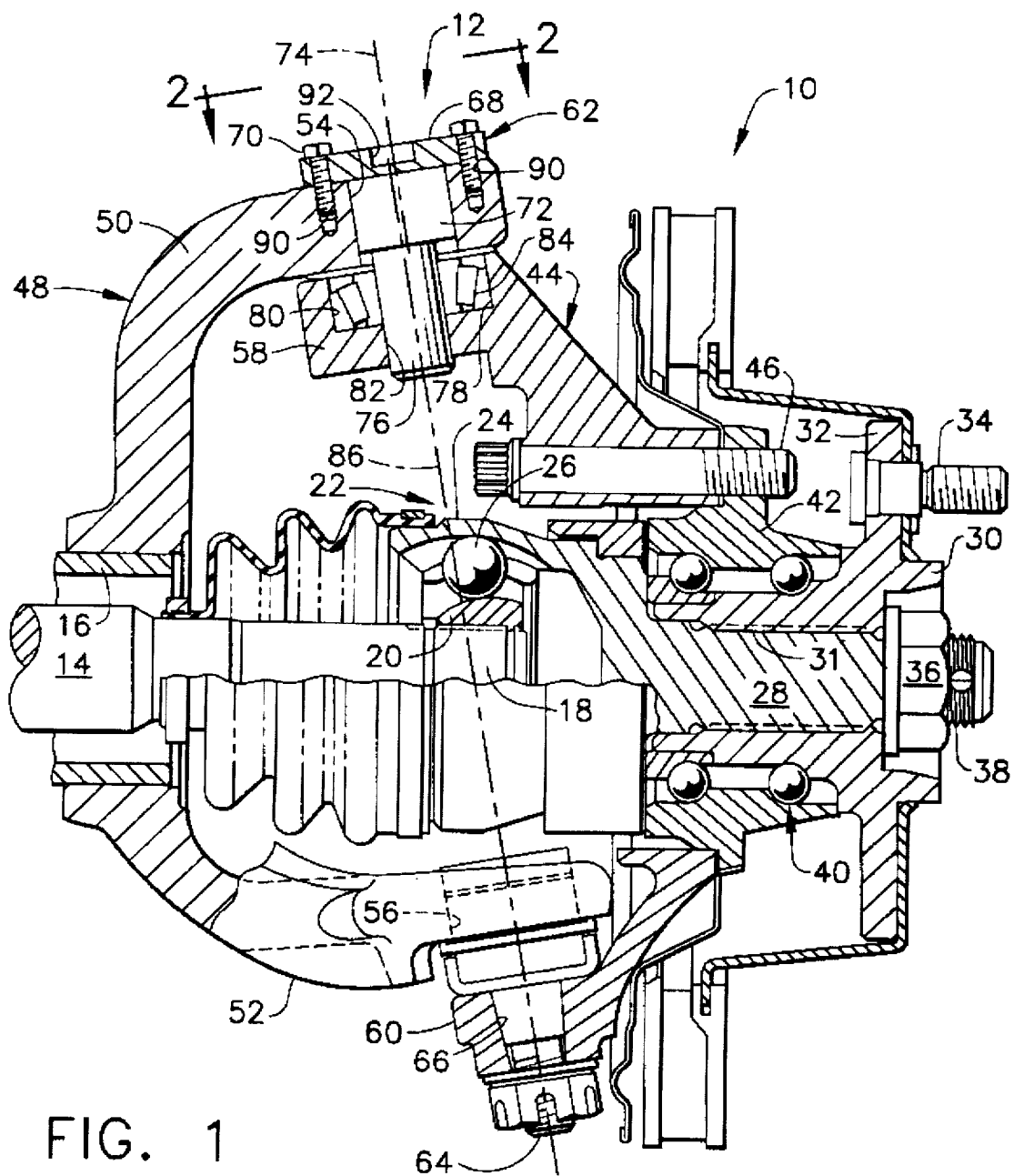
FIG. 1 is an elevational view, partly in cross-section, illustrating a steerable axle assembly according to a preferred embodiment of the present invention.

Referring now to the drawings, wherein like reference numerals have been used for similar elements throughout, FIG. 1 is an elevational view, partly in cross-section, illustrating a steerable axle assembly 10 which incorporates the caster adjustment apparatus, indicated generally at 12, according to a preferred embodiment of the present invention. While the caster adjustment apparatus 12 is illustrated for use in axle assembly 10, which comprises a steerable and driven axle assembly, it should be understood that apparatus 12 may be advantageously utilized in other axle assemblies which are steerable but non-driven. Axle assembly 10 includes an axle shaft 14 originating from a differential (not shown) disposed in part within axle tube 16. Axle shaft 14 carries, at an outboard end 18, an inner race 20 of a constant velocity (CV) joint indicated generally at 22. CV joint 22 further includes an outer race 24 and torque transmitting balls 26 (only one shown) disposed in grooves formed in the inner race 20 and outer race 24 of joint 22. In the illustrated embodiment shown in FIG. 1, outer race 24 of joint 22 is integrally formed with a wheel spindle 28. Alternatively, outer race 24 may be fastened to spindle 28. However, the particular relationship between outer race 24 and spindle 28 does not form a part of the present invention. A wheel hub 30 is splined at 31 to spindle 28 and includes a wheel mounting flange 32. The vehicle wheels (not shown) are mounted to flange 32 via studs 34 extending through flange 32. Wheel hub 30 is retained on spindle 28 by a nut 36 which engages a threaded outboard end 38 of spindle 28. Wheel spindle 28 is rotatably supported within axle assembly 10 by a bearing assembly indicated generally at 40. A stationary outer race 42 of bearing assembly 40 is fastened to a steering knuckle 44 via conventional fasteners, such as bolts 46, thereby coupling the steering knuckle 44 to wheel hub 30 and wheel spindle 28 thereby permitting steering action of the vehicle wheel. During operation of the vehicle, torque is transmitted from axle shaft 14 through CV joint 22 to wheel spindle 28 and wheel hub 30 into the vehicle's tires mounted on flange 32 of hub 30.

Figure 2:
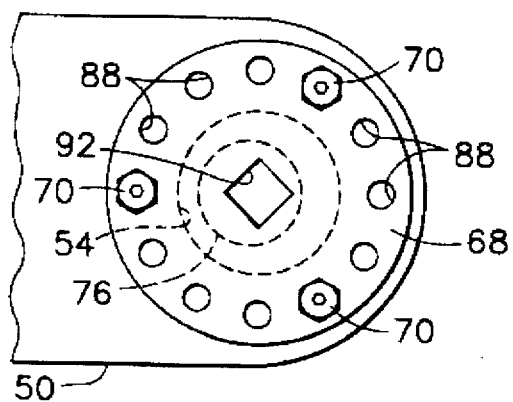
FIG. 2 is a plan view of the bearing cap shown in FIG. 1 taken along line 2—2 in FIG. 1.

Referring now to FIGS. 1 and 2, the specific construction of the caster adjustment apparatus 12 is discussed in greater detail. A tube yoke 48 is attached to axle tube 16 and includes vertically spaced upper and lower arms 50 and 52, respectively. Upper arm 50 has a generally cylindrical bore 54 formed therethrough and similarly, lower arm 52 has a generally cylindrical bore 56 formed therethrough. The steering knuckle 44 includes an upper flange 58 disposed adjacent the upper arm 50 of tube yoke 48, and a lower flange 60 disposed adjacent the lower arm 52 of tube yoke 48. The steering knuckle 44 is rotatably attached to the tube yoke 48 via a bearing cap indicated generally at 62 and a conventional ball joint, indicated generally at 64. The ball joint 64 is disposed in bore 56 formed through the lower arm 52 of tube yoke 48 and a tapered bore 66 extending through the lower flange 60 of steering knuckle 44. The ball joint 64 includes an internal spherical bearing (not shown) and functions in a conventional manner so as to permit the lower flange 60 of steering knuckle 44 to rotate relative to the lower arm 52 of tube yoke 48. The bearing cap 62, which comprises a central feature of the present invention, includes a mounting flange 68, which is preferably circular, releasably attached to the upper arm 50 of the tube yoke 48 via conventional fasteners such as bolts 70. Bearing cap 62 further includes a first, generally cylindrical portion 72 which is attached to the mounting flange 68 and disposed within the bore 54 formed in and extending through upper arm 50 of tube yoke 48. Cylindrical portion 72 includes a longitudinal centerline axis 74. Bearing cap 62 further includes a second, generally cylindrical portion 76 which is attached to the first cylindrical portion 72 and is disposed within a stepped bore 78 formed in the upper flange 58 of the steering knuckle 44. Stepped bore 78 includes a first relatively larger diameter portion 80 extending partly through flange 58 and a second, relatively smaller diameter portion 82 extending through the remainder of flange 58. A tapered bearing assembly 84 is disposed in the relatively larger diameter portion 80 of stepped bore 78. The generally cylindrical portion 76 of bearing cap 62 extends through both the larger diameter portion 80 and the smaller diameter portion 82 of stepped bore 78 and is disposed in close proximity with bearing assembly 84 so as to pilot bearing assembly 84. The generally cylindrical portion 76 includes a longitudinal centerline axis 86 which coincides with the centerline axis of ball joint 64 and comprises the so-called kingpin axis. Axis 86 of the generally cylindrical portion 76 is offset from the centerline axis 74 of the generally cylindrical portion 72 such that portions 76 and 72 are eccentrically disposed relative to one another. The generally cylindrical portions 72 and 76 preferably comprise solid cylindrical portions and additionally, mounting flange 68 and the generally cylindrical portions 72 and 76 are made of a one-piece construction. As best seen in FIG. 2, flange 68 of bearing cap 62 includes a plurality of circumferentially spaced bolt holes 88 which, in the illustrated embodiment, comprises twelve holes 88. The upper arm 50 of the tube yoke 48 includes a plurality of circumferentially spaced bolt holes 90 formed therein and extending partially therethrough which are aligned with a portion of the holes 88 for accepting bolts 70. In the illustrated embodiment, shown in FIGS. 1 and 2, the upper arm 50 includes three bolt holes 90 and flange 68 is releasably attached to upper arm 50 by inserting bolts 70 through three of the holes 88 and into the corresponding ones of aligned holes 90. It should be understood that different numbers of bolt holes 88 and 90, as well as bolts 70 may be utilized to releasably attach flange 68 to upper arm 50 provided the number of holes 88 are evenly divisible by the number of holes 90. Since the number of holes 88 are greater than the number of holes 90, mounting flange 68 may be indexed, or rotated relative to upper arm 50 so as to provide a plurality of releasably attached positions of bearing cap 62 relative to upper arm 50. Due to the eccentric disposition of the generally cylindrical portion 76 relative to the generally cylindrical portion 72 of bearing cap 62, rotation of the bearing cap 62 relative to the upper arm 50 of tube yoke 48 from a first releasably attached position to a second releasably attached position causes the upper flange 58 of the steering knuckle 44 to move relative to the upper arm 50 of the tube yoke 48 thereby resulting in an adjustment of caster angle, commonly referred to as caster. The caster angle is not shown in FIG. 1 but comprises the angle between axis 86 and the vertical, when axle assembly 10 is viewed in a side elevation. Mounting flange 68 of bearing cap 62 includes a generally rectangular recess 92 formed in an outer surface of flange 68 and extending partially through flange 68. Recess 92 is adapted to receive a tool which may be used to facilitate rotation of bearing cap 62 from one releasably attached position to another. Recess 92 may comprise other shapes to accept conventional tools. A limited caster adjustment may be accomplished with the caster adjustment apparatus 12 with only negligible effect to the camber of the vehicle wheel. If the caster adjustment is too large, an undesirable change in camber may result and accordingly, care must be taken in this regard. Alternatively, tube yoke 48 and steering knuckle 44 may be reconfigured with appropriate bores formed in arms 50 and 52 of tube yoke 48 and flanges 58 and 60 of steering knuckle 44 so that the upper flange 58 of steering knuckle 44 may be rotatably attached to the upper arm 50 of tube yoke 48 via ball joint 64 with the lower flange 60 of steering knuckle 44 rotatably attached to the lower arm 52 of tube yoke 48 via bearing cap 62. With this configuration caster adjustment may be achieved by indexing the bearing cap 62 from one releasably attached position to another so as to cause the lower flange 60 of steering knuckle 44 to move relative to the lower arm 52 of tube yoke 48. The flange 68 of bearing cap 62 in this configuration is preferably disposed below, or outside, of arm 52 and flange 60 thereby providing easy access.

Figure 3:
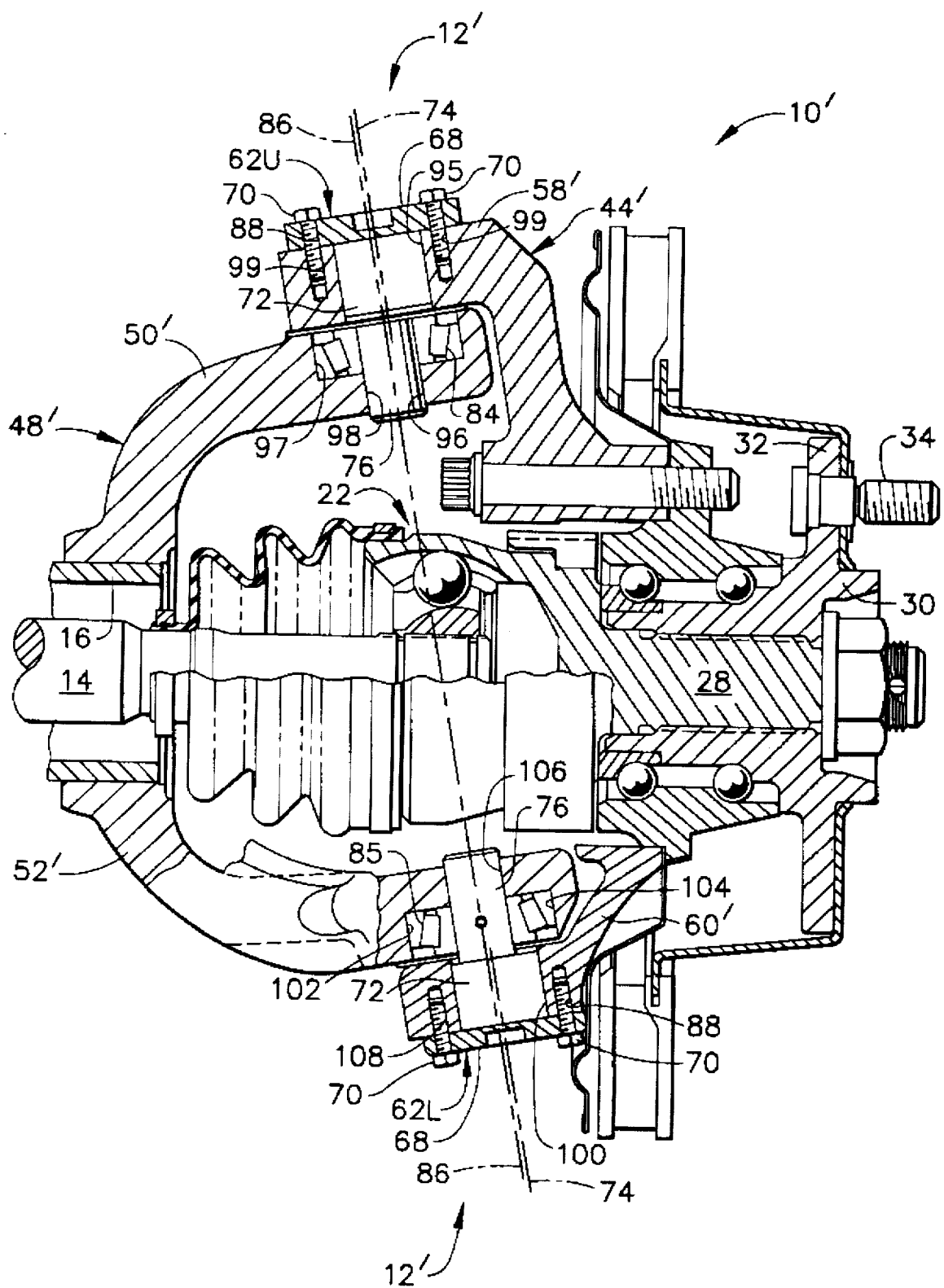
FIG. 3 is a side elevational view illustrating a steerable axle assembly according to an alternative embodiment of the present invention.

FIG. 3 illustrates a steerable axle assemble 10' according to an alternative embodiment of the present invention. The elements of assembly 10' may be the same as those of assembly 10 except as subsequently discussed. Assembly 10' includes a tube yoke 48' which is attached to the axle tube 16 and includes an upper arm 50' and a lower arm 52'. Assembly 10' further includes a steering knuckle 44' which is coupled to the wheel hub 30 and wheel spindle 28 as discussed with respect to knuckle 44 of assembly 10. Steering knuckle 44' includes an upper flange 58' and a lower flange 60'. Assembly 10' further includes a caster adjustment apparatus, indicated generally at 12', which is used to rotatably attach the steering knuckle 44' to the tube yoke 48'. Like apparatus 12, apparatus 12' includes a bearing cap 62, indicated as 62U in FIG. 3, which is used to rotatably attach the upper flange 58' of steering knuckle 44' to the upper arm 50' of tube yoke 48'. However, as noted by comparing FIGS. 3 and 1, the vertical positioning of tube yoke 48' relative to steering knuckle 44' differs from that of tube yoke 48 relative to steering knuckle 44. As shown in FIG. 3, the upper flange 58' of steering knuckle 44' is positioned adjacent to and above the upper arm 50' of tube yoke 48', and lower flange 60' of steering knuckle 44' is disposed adjacent to and below the lower arm 52' of tube yoke 48'. By comparison, as shown in FIG. 1, the upper arm 50 of tube yoke 48 is disposed above the upper flange 58 of steering knuckle 44 while the lower flange 60 of steering knuckle 44 is disposed adjacent to and below the lower arm 52 of tube yoke 48. In order to accommodate the difference in relative positioning of upper flange 58' of steering knuckle 44' relative to upper arm 50' of tube yoke 48' and the preferred orientation of bearing cap 62U, the upper flange 58' includes a generally cylindrical bore 95 extending therethrough which accepts the first, generally cylindrical portion 72 of bearing cap 62U. Additionally, flange 58' includes a plurality of bolt holes 99 for purposes of releasably attaching, or bolting, flange 68 of bearing cap 62U to flange 58'. A portion of the bolt holes 99 are aligned with the holes 88 through flange 68 of bearing cap 62U and the numbers of holes 88 and 99 may be the same as the number of holes 88 and 90, respectively, shown in FIGS. 1 and 2 and discussed previously with respect to assembly 10. The second, generally cylindrical portion 76 of bearing cap 62U is attached to portion 72 and is disposed in a stepped bore 96 formed in the upper arm 50' of tube yoke 48'. The stepped bore 96 includes a first relatively larger diameter portion 97 extending partially through arm 50' and a second, relatively smaller diameter portion 98 extending through the remainder of arm 50'. Tapered bearing assembly 84 is disposed in the relatively larger diameter portion 97 of stepped bore 96. The generally cylindrical portion 76 of bearing cap 62U extends through both the larger diameter portion 97 and the smaller diameter portion 98 of stepped bore 96 and is disposed in close proximity with the bearing assembly 84 so as to pilot assembly 84.

Assembly 10' further differs from assembly 10 since, unlike assembly 10, assembly 10' does not include the conventional ball joint 64 for rotatably attaching the lower flange 60' of steering knuckle 44' to the lower arm 52' of tube yoke 48'. Instead, caster adjustment apparatus 12' includes a second bearing cap 62 which is used for that purpose and is denoted bearing cap 62L in FIG. 3. The construction of the lower bearing cap 62L is the s bearing cap 62 described previously with respect to assembly 10. The mounting flange 68 of the lower bearing cap 62L is releasably attached to the lower flange 60' of steering knuckle 44' via conventional fasteners such as bolts 70. The first, generally cylindrical portion 72 of bearing cap 62L is attached to the mounting flange 68 and disposed within a generally cylindrical bore 100 formed in and extending through the lower flange 60' of steering knuckle 44'. The second, generally cylindrical portion 76 of bearing cap 62L is attached to portion 72 and is disposed in a stepped bore 102 formed in the lower arm 52' of the tube yoke 48'. The stepped bore 102 includes a first relatively larger diameter portion 104 extending partially through arm 52' and a second, relatively smaller diameter portion 106 extending through the remainder of arm 52'. A tapered bearing assembly 85 is disposed in the relatively larger diameter portion 104 of stepped bore 102. The generally cylindrical portion 76 of bearing cap 62L extends through both the larger diameter portion 104 and the smaller diameter portion 106 of stepped bore 102 and is disposed in close proximity with the bearing assembly 85 so as to pilot assembly 85. As with the upper bearing cap 62U, the centerline axis 86 of portion 76 of the lower bearing cap 62L is offset from the centerline axis 74 of the portion 72 of bearing cap 62L, such that portion 76 and 72 are eccentrically disposed relative to one another. The centerline axis 86 of portion 76 of bearing cap 62L is coincident with the centerline axis 86 of bearing cap 62U and comprises the so-called kingpin axis. The lower flange 60' of the steering knuckle 44' includes a plurality of circumferentially spaced bolt holes 108 formed therein and extending partially therethrough which are aligned with a portion of the holes 88 in flange 68, for accepting bolts 70. The numbers of holes 88 and 108 may be the same as the number of holes 88 and 90, respectively, shown in FIGS. 1 and 2 and discussed previously with respect to assembly 10. Accordingly, mounting flange 68 may be indexed, or rotated relative to the lower flange 60' so as to provide a plurality of releasably attached positions of the lower bearing cap 62L relative to lower flange 60'. Due to the eccentric disposition of the generally cylindrical portions 72 and 76 of the bearing cap 62L, rotation of the bearing cap 62L relative to the lower flange 60' of steering knuckle 44' from a first releasably attached position to a second releasably attached position causes the lower flange 60' of the steering knuckle 44' to move relative to the lower arm 52' of the tube yoke 48' thereby resulting in an adjustment of caster angle, commonly referred to as caster. Due to the ability to adjust caster with either upper bearing cap 62U or lower bearing cap 62L, assembly 10' is capable of twice the caster adjustment of assembly 10. When caster is adjusted using both the upper bearing cap 62U and the lower bearing cap 62L, camber is only negligibly affected provided that the rotation, or indexing of the upper bearing cap 62U relative to upper flange 58' is consistent with the relative rotation, or indexing of the lower bearing cap 62L relative to the lower flange 60' of the steering knuckle 44' to obtain the same relative rotation of the steering knuckle 44'.

While the foregoing description has set forth the preferred embodiments of the invention in particular detail, it must be understood that numerous modifications, substitutions, and changes can be undertaken without departing from the true spirit and scope of the present invention as defined by the ensuing claims. For instance, although the caster adjustment apparatus of the present invention has been illustrated for use in steerable axle assemblies 10 and 10' which comprise beam axles, it should be understood that the caster adjustment apparatus of the present invention may be advantageously utilized in independent axles. The invention is therefore not limited to specific preferred embodiments as described, but is only limited as defined by the following claims.

What is claimed is:

1. A steerable axle assembly for use in a motor vehicle, said assembly comprising:

a tube yoke attached to an axle tube of the vehicle, said tube yoke having vertically spaced upper and lower arms each having a bore formed therethrough;

a steering knuckle coupled to a wheel spindle of the vehicle, said steering knuckle having an upper flange disposed adjacent said upper arm of said tube yoke and a lower flange disposed adjacent said lower arm of said tube yoke, wherein each of said flanges includes a bore formed therein, wherein said bore of a first one of said arms and said flanges comprises a stepped bore;

a selectively rotatable bearing assembly disposed in a first portion of said stepped bore;

a bearing cap having a mounting flange releasably attached to a second one of said arms and said flanges, said second one of said arms and said flanges being disposed adjacent said first one of said arms and said flanges, said bearing cap further including a first generally cylindrical portion attached to said mounting flange and disposed within said bore of said second one of said arms and said flanges, and a second generally cylindrical portion attached to said first generally cylindrical portion and disposed in said stepped bore so as to pilot said bearing assembly;

wherein said first generally cylindrical portion has a first longitudinal centerline axis, and said second generally cylindrical portion includes a second longitudinal centerline axis which is offset from said first axis;

wherein rotation of said bearing cap relative to said second one of said arms and said flanges from a first releasably attached position to a second releasably attached position causes said steering knuckle to move relative to said tube yoke thereby resulting in an adjustment of caster.

2. The steerable axle assembly as recited in claim 1, further comprising:

a plurality of fasteners; and wherein said mounting flange of said bearing cap is releasably attached to said second one of said arms and said flanges by said fasteners.

3. The steerable axle assembly as recited in claim 2, wherein:

said mounting flange of said bearing cap includes a first plurality of circumferentially spaced bolt holes, and said second one of said arms and said flanges includes a second plurality of circumferentially spaced bolt holes, and wherein the number of said holes of said first plurality of holes is greater than the number of said holes of said second plurality of holes;

said first plurality of bolt holes are aligned with a portion of said second plurality of bolt holes;

said fasteners are inserted through said first plurality of bolt holes and said portion of said second plurality of bolt holes.

4. The steerable axle assembly as recited in claim 3, wherein:

the number of said holes of said first plurality of holes is evenly divisible by the number of said holes of said second plurality of holes thereby permitting said bearing cap to be indexed relative to said second one of said arms and said flanges.

5. The steerable axle assembly as recited in claim 1, wherein said first and second generally cylindrical portions are solid.

6. The steerable axle assembly as recited in claim 5, wherein said mounting flange, said first generally cylindrical portion, and said second generally cylindrical portion of said bearing cap comprise a one-piece construction.

7. The steerable axle assembly as recited in claim 1, wherein said bearing assembly comprises a tapered bearing assembly.

8. The steerable axle assembly as recited in claim 1, wherein:

said mounting flange of said bearing cap is releasably attached to said upper arm of said tube yoke;

said stepped bore is formed in said upper flange of said steering knuckle;

said first generally cylindrical portion of said bearing cap is disposed in said bore of said upper arm of said tube yoke;

said second generally cylindrical portion of said bearing cap extends through said first portion of said stepped bore and through a second, relatively smaller diameter portion of said stepped bore.

9. The steerable axle assembly as recited in claim 8, further comprising:

a ball joint;

wherein said lower flange of said steering knuckle is rotatably attached to said lower arm of said tube yoke by said ball joint.

10. The steerable axle assembly as recited in claim 1, wherein:

said mounting flange of said bearing cap is releasably attached to said upper flange of said steering knuckle;

said stepped bore is formed in said upper arm of said tube yoke;

said first generally cylindrical portion of said bearing cap is disposed in said bore of said upper flange of said steering knuckle;

said second generally cylindrical portion of said bearing cap extends through said first portion of said stepped bore and through a second, relatively smaller diameter portion of said stepped bore;

said bearing cap comprises a first bearing cap;

said assembly further comprises a second bearing cap rotatably attaching said lower flange of said steering knuckle to said lower arm of said tube yoke.

11. The steerable axle assembly as recited in claim 10, wherein:

said lower arm of said tube yoke includes a stepped bore formed therein; and said second bearing cap includes a mounting flange releasably attached to said lower flange of said steering knuckle, a first generally cylindrical portion attached to said mounting flange and disposed in a bore formed in said lower flange of said steering knuckle and a second generally cylindrical portion attached to said first generally cylindrical portion and disposed in said stepped bore formed in said lower arm of said tube yoke.

* * * * *